(12) United States Patent
Ersek et al.

(10) Patent No.: US 9,267,318 B2
(45) Date of Patent: Feb. 23, 2016

(54) METHOD AND APPARATUS FOR PROVIDING AN INDICATION OF MOVEMENT, PARTICULARLY FOR RECOGNITION OF BLOCKING IN A LOCKING SYSTEM

(75) Inventors: Zoltan Ersek, Stuttgart (DE); Janos Markus, Dunaharaszti (HU)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/997,921

(22) PCT Filed: Nov. 17, 2011

(86) PCT No.: PCT/EP2011/070369
§ 371 (c)(1),
(2), (4) Date: Aug. 12, 2013

(87) PCT Pub. No.: WO2012/089405
PCT Pub. Date: Jul. 5, 2012

(65) Prior Publication Data
US 2013/0305608 A1    Nov. 21, 2013

(30) Foreign Application Priority Data
Dec. 27, 2010 (DE) .......... 10 2010 064 213

(51) Int. Cl.
| E05F 15/00 | (2015.01) |
| G05B 19/4062 | (2006.01) |
| E05F 15/40 | (2015.01) |

(52) U.S. Cl.
CPC ............ *E05F 15/0004* (2013.01); *E05F 15/40* (2015.01); *G05B 19/4062* (2013.01);
(Continued)

(58) Field of Classification Search
CPC ............. H02H 7/0851; E05Y 2900/55; E05F 15/0017; E05F 15/1684

USPC ........ 49/26–28, 227, 348–352; 318/445, 466, 318/468, 265, 266
See application file for complete search history.

(56) References Cited

U.S. PATENT DOCUMENTS

| 5,436,539 A * | 7/1995 | Wrenbeck et al. ............ 318/265 |
| 5,497,326 A * | 3/1996 | Berland et al. ................. 701/36 |

(Continued)

FOREIGN PATENT DOCUMENTS

| CN | 1120263 | 4/1996 |
| CN | 1413302 | 4/2003 |

(Continued)

OTHER PUBLICATIONS

International Search Report for Application No. PCT/EP2011/070369 dated Jan. 20, 2012 (2 pages).

*Primary Examiner* — Katherine Mitchell
*Assistant Examiner* — Justin Rephann
(74) *Attorney, Agent, or Firm* — Michael Best & Friedrich LLP

(57) ABSTRACT

The invention relates to a method for providing an indication of movement from a sensor signal from a position transmitter (9), wherein the indication of movement indicates a speed of movement, wherein the sensor signal from the position transmitter (9) generates an edge following a movement via a particular path range having the following steps:—a pulse duration (dT) is ascertained (S1) as the interval of time between the last two provided edges of the sensor signal;—depending on whether a period which corresponds to the pulse duration (dT) has elapsed since the last provided edge of the sensor signal, an indication which is dependent on the pulse duration (dT) or an indication which is dependent on the period since the last edge of the sensor signal is provided (S4, S6) as an indication of movement.

9 Claims, 3 Drawing Sheets

(52) U.S. Cl.
CPC ... *E05Y2900/55* (2013.01); *G05B 2219/37624* (2013.01); *G05B 2219/42291* (2013.01); *G05B 2219/45242* (2013.01)

(56) References Cited

U.S. PATENT DOCUMENTS

| | | | |
|---|---|---|---|
| 5,689,160 A * | 11/1997 | Shigematsu et al. | 318/281 |
| 5,723,960 A * | 3/1998 | Harada | 318/469 |
| 5,754,017 A * | 5/1998 | Tsuge et al. | 318/286 |
| 5,801,501 A * | 9/1998 | Redelberger | 318/283 |
| 5,857,061 A * | 1/1999 | Chang et al. | 388/829 |
| 5,977,732 A * | 11/1999 | Matsumoto | 318/283 |
| 6,239,610 B1 * | 5/2001 | Knecht et al. | 324/765.01 |
| 6,531,840 B2 * | 3/2003 | Sugawara | 318/445 |
| 6,580,242 B2 * | 6/2003 | Hirose et al. | 318/445 |
| 6,600,284 B1 * | 7/2003 | Weber et al. | 318/466 |
| 6,678,601 B2 * | 1/2004 | Whinnery | 701/49 |
| 6,686,669 B1 * | 2/2004 | Knab et al. | 307/9.1 |
| 6,701,673 B1 * | 3/2004 | Kessler et al. | 49/506 |
| 6,772,559 B1 * | 8/2004 | Bouamra et al. | 49/26 |
| 6,788,016 B2 * | 9/2004 | Whinnery | 318/468 |
| 6,794,837 B1 * | 9/2004 | Whinnery et al. | 318/282 |
| 6,806,664 B2 * | 10/2004 | Beishline | 318/280 |
| 6,840,113 B2 * | 1/2005 | Fukumura et al. | 73/760 |
| 6,936,988 B2 * | 8/2005 | Nakazawa et al. | 318/469 |
| 7,067,794 B2 * | 6/2006 | Le Gallo et al. | 250/221 |
| 7,067,996 B2 * | 6/2006 | Yamamoto | 318/55 |
| 7,170,244 B2 * | 1/2007 | Choby | 318/280 |
| 7,319,301 B2 * | 1/2008 | Pribisic | 318/468 |
| 7,977,902 B2 * | 7/2011 | Batejat et al. | 318/466 |
| 2002/0024310 A1 * | 2/2002 | Hirose et al. | 318/445 |
| 2003/0115803 A1 * | 6/2003 | Kidokoro | 49/28 |
| 2003/0222610 A1 * | 12/2003 | Whinnery | 318/362 |
| 2004/0006918 A1 * | 1/2004 | Fitzgibbon | 49/28 |
| 2004/0008001 A1 | 1/2004 | Kikuta et al. | |
| 2004/0104701 A1 * | 6/2004 | Ohshima | 318/445 |
| 2004/0138843 A1 * | 7/2004 | Bouamra et al. | 702/94 |
| 2006/0254148 A1 * | 11/2006 | Noro et al. | 49/352 |
| 2008/0061720 A1 * | 3/2008 | Takahashi | 318/286 |
| 2008/0110092 A1 * | 5/2008 | Takahashi | 49/28 |
| 2009/0206784 A1 * | 8/2009 | Inoue et al. | 318/434 |
| 2009/0272035 A1 * | 11/2009 | Boisvert et al. | 49/28 |
| 2009/0295556 A1 * | 12/2009 | Inoue et al. | 340/438 |
| 2010/0319268 A1 * | 12/2010 | Bizard | 49/506 |
| 2012/0180394 A1 * | 7/2012 | Shinohara | 49/349 |

FOREIGN PATENT DOCUMENTS

| | | |
|---|---|---|
| CN | 1811461 | 8/2006 |
| CN | 1840847 | 10/2006 |
| CN | 201024825 | 2/2008 |
| CN | 101210934 | 7/2008 |
| EP | 2110212 | 10/2009 |
| FR | 2941793 | 8/2010 |

* cited by examiner

METHOD AND APPARATUS FOR PROVIDING AN INDICATION OF MOVEMENT, PARTICULARLY FOR RECOGNITION OF BLOCKING IN A LOCKING SYSTEM

BACKGROUND OF THE INVENTION

The invention relates to methods and apparatuses for generating an indication of speed on the basis of a position transmitter. The invention also relates to closing apparatuses with a means for detecting trapping for the purpose of implementing a trapping protection function.

Electrical drive units are used in a multiplicity of applications and are used, in particular, to cause a movement of elements. For example, drive units may be used in automatic closing apparatuses, for example electrical window regulators or sliding roofs in motor vehicles. In order to increase the comfort for the passengers there, an additional function may be implemented, with the result that the operator must only start the opening or closing movement of the window by actuating an actuating element once for a particular direction, that is to say an opening or closing direction. The window is then automatically moved even after releasing the actuation of the actuating element.

In the case of such a function or a comparable function, the operator does not need to continue to monitor the further movement of the element or the window and there is therefore the risk of objects or body parts being trapped between the movable part and a stationary part.

In particular, electrical window regulators must be provided with a so-called anti-trapping function which detects a trapped object or body part and releases it from the trapped state again.

Trapping may be detected by different types of sensors on the basis of measurement variables. For example, a pressure sensor, such as a piezoelectric sensor, on a stop edge, toward which the movable element moves, can detect when the element strikes the stop edge. The movement of the movable element or the rotational movement of the drive unit driving the movable element can be detected using a motion sensor, for example a Hall sensor, an AMR sensor, a GMR sensor or the like. Alternatively or additionally, a current sensor may also be provided for the purpose of detecting a motor current of the drive unit.

For reasons of cost, speed sensors based on magnetic or optical position transmitters, which are directly arranged on an output shaft of the drive unit and output a pulse or a level change in the event of a movement by a particular angular range, are used to implement such functions. The interval of time between the edges generated by the position transmitter depends directly in this case on the rotational speed of the drive unit. In this case, the rotational speed is determined from the interval of time between the edges or from their frequency. For this reason, the temporal resolution of the rotational speed indication determined using the position transmitters naturally fluctuates since the interval of time between the individual edges of the position transmitter becomes longer, in particular at low rotational speeds. This results in there being no current rotational speed indication within the period between two edges. In time-critical applications in particular, such as the trapping protection function in electrical closing apparatuses, the period during which no current rotational speed indication is provided may be too long to meet the legal requirements imposed on the reaction speed and sensitivity of the detection of trapping of an object or body part.

Therefore, the object of the present invention is to provide a method and an apparatus which can also be used to provide a continuous rotational speed indication when using a position transmitter as the rotational speed or motion sensor.

SUMMARY OF THE INVENTION

A first aspect provides a method for providing an indication of movement from a sensor signal from a position transmitter, the indication of movement indicating a speed of movement, the sensor signal from the position transmitter generating an edge following a movement over a particular travel range. The method comprises the following steps of:

determining a pulse duration as the interval of time between the last two provided edges of the sensor signal;

providing an indication which depends on the pulse duration or an indication which depends on the period since the last edge of the sensor signal as the indication of movement, depending on whether a period corresponding to the pulse duration has elapsed since the last provided edge of the sensor signal.

An idea of the present invention is to provide a continuous or quasi-continuous indication of movement which is provided on the basis of a sensor signal generated by a position transmitter for detecting a movement, to be precise even at relatively low speeds with improved accuracy and temporal resolution. In other words, the above method is advantageous where the intention is to perform functions in which indications of movement are required at shorter intervals of time than the edges of the sensor signal from a corresponding position transmitter arrive. This makes it possible to provide a more current indication of movement even at low speeds at which the temporal sequence of the edges of the sensor signal becomes too short to directly determine a current indication of movement therefrom. In previous methods, no indication of movement is provided, in particular, within the period since the last edge of the sensor signal. For this reason, the above method proposes updating the indication of movement, in particular even after the last edge of the sensor signal has been received, in order to provide a continuous or quasi-continuous indication of movement.

An indication which depends on the pulse duration can be provided as the indication of movement if a period corresponding to the pulse duration has not yet elapsed since the last provided edge.

Provision may be made for the indication of movement to be determined as the ratio between the particular travel range and the pulse duration or as the ratio between the particular travel range and the period elapsed since the last edge of the sensor signal.

Furthermore, the indication of movement can be provided continuously or at regular intervals of time.

According to one embodiment, the regular intervals of time may be shorter than the intervals of time between the edges of the sensor signal at a predefined maximum speed of movement.

Another aspect provides an apparatus for providing an indication of movement from a sensor signal from a position transmitter, the indication of movement indicating a speed of movement, the sensor signal from the position transmitter generating an edge following a movement over a particular travel range. The apparatus is designed:

to determine a pulse duration as the interval of time between the last two provided edges of the sensor signal;

to provide an indication which depends on the pulse duration or an indication which depends on the period since the last edge of the sensor signal as the indication of movement, depending on whether a period corresponding to the pulse duration has elapsed since the last provided edge of the sensor signal.

Another aspect provides a system, in particular an automatic closing system, comprising:
an element to be moved;
a drive unit which is coupled to the element to be moved in order to move the latter;
a position transmitter which, depending on a movement of the drive unit or of the element, outputs sensor signals which have an edge following movement over a particular travel range,
a control unit which is designed
to determine a pulse duration as the interval of time between the last two provided edges of the sensor signal and
to provide an indication which depends on the pulse duration or an indication which depends on the period since the last edge of the sensor signal as the indication of movement, depending on whether a period corresponding to the pulse duration has elapsed since the last provided edge of the sensor signal.

Another aspect provides for the use of the above apparatus for a closing system.

Another aspect provides a computer program product containing a program code which carries out the above method when executed on a data processing unit.

BRIEF DESCRIPTION OF THE DRAWINGS

Preferred embodiments of the present invention are explained in more detail below using the accompanying drawings, in which.

DETAILED DESCRIPTION

Figure 1:
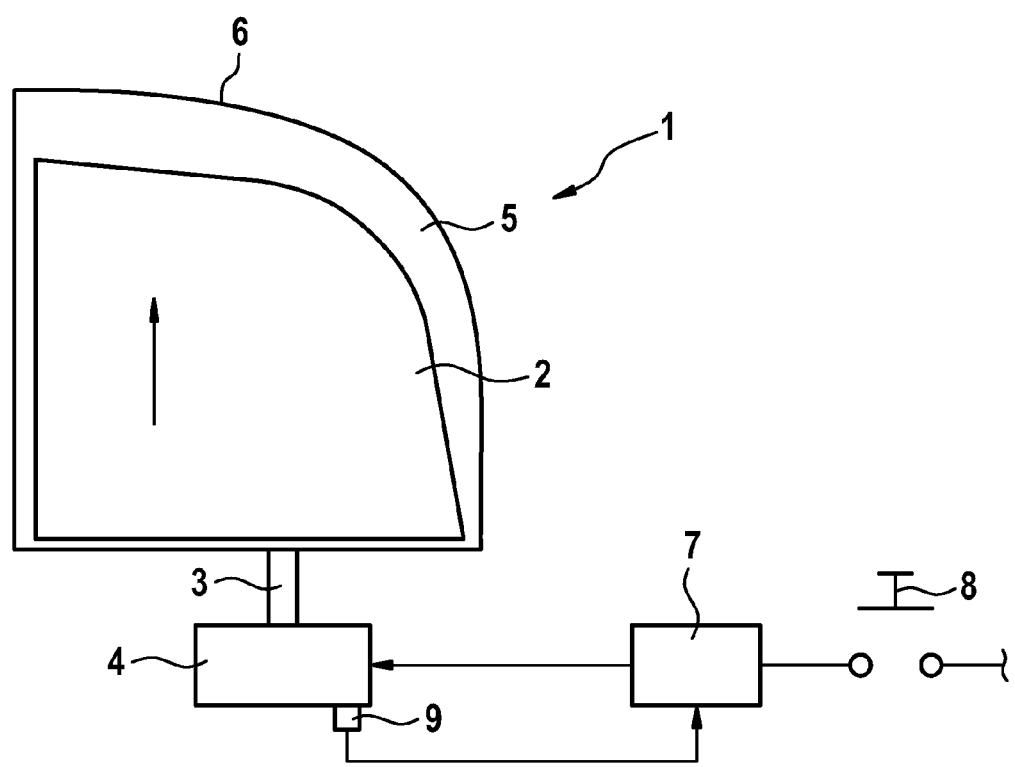
FIG. 1 shows a schematic illustration of a window regulator system having a position transmitter as the rotational speed sensor.

FIG. 1 illustrates, as an example of a use of the function of the continuous indication of movement, an electrical drive unit of an automatic window regulator system 1 for a side window of a motor vehicle. The window regulator system 1 is representative of any type of drive system for driving components, in particular for closing systems in motor vehicle applications.

The automatic window regulator system 1 comprises a window pane 2 as the movable element, which window pane can be moved in a window frame 5 using a closing mechanism 3. The window pane 2 is driven by an electric motor 4 as the electrical drive unit via the closing mechanism 3 which may comprise a suitable transmission or mechanism. The electric motor 4 is controlled by a control unit 7 on the basis of actuation of an operating element 8, with the result that the window pane 2 moves in a predefined direction.

For example, when the operating element 8 is actuated in order to close the window, the window pane 2 can be moved upward, that is to say in a closing direction, by rotation of the electric motor 4, with the result that the window pane 2 carries out a closing movement. In a similar manner, when the operating element 8 is actuated in order to open the window, the window pane 2 can be moved downward, that is to say in an opening direction, by opposite rotation of the electric motor 4, with the result that the window pane 2 carries out an opening movement.

It is also possible—in a manner implemented by the control unit 7—to activate an automatic running mode by actuating the operating element 8 in a particular manner, in which mode the predefined movement of the window pane 2 is continued, even after the operating element 8 has been released, until either the operating element 8 is actuated again or until the window pane 2 has reached a stop position in a complete open position or in a complete closed position.

Furthermore, the electric motor 4 or the closing mechanism 3 is provided with a position transmitter 9 which can detect a relative position change in a movement of the shaft of the electric motor 4, of the closing mechanism 3 or of the window pane 2. In particular, the position transmitter 9 emits pulses in the case of a rotational movement corresponding to the rotation of the shaft of the electric motor 4. Examples of such position transmitters 9 are a Hall sensor, a GMR sensor, an AMR sensor or the like which detect a change in a magnetic field dependent on a rotational movement. When the shaft of the electric motor 4 moves, the position transmitter 9 outputs a signal with different levels as an indication of movement, a level change being effected after a particular angular range has been covered, with the result that an edge of a sensor signal is generated.

The pulses from the position transmitter 9 are used to determine the rotational speed of the electric motor 4 and to provide downstream functions with said rotational speed. The pulses provided can also be counted in order to provide an absolute position of the shaft of the electric motor 4, which is used for commutation of the electric motor 4 if the latter is electronically commutated.

A trapping protection function which detects trapping using motor characteristic variables is implemented in the control unit 7. Trapping is present if an object or body part gets between an edge of the window pane 2 opposite the stop edge and the window frame 5 and a closing movement of the window pane 2 exerts a force on the object or the body part.

Trapping can be determined in the control unit 7 on the basis of or with the aid of an indication of movement of the window pane, which indication is determined on the basis of the rigid coupling by the closing mechanism 3 in the form of the rotational speed of the electric motor 4. For this purpose, the rotational speed of the electric motor 4 is continuously monitored. If an unexpectedly low rotational speed is determined and/or if an unexpectedly low gradient is determined, for example a gradient below a gradient threshold value which, under certain circumstances, may depend on the position of the window pane 2, trapping is detected.

Figure 2:
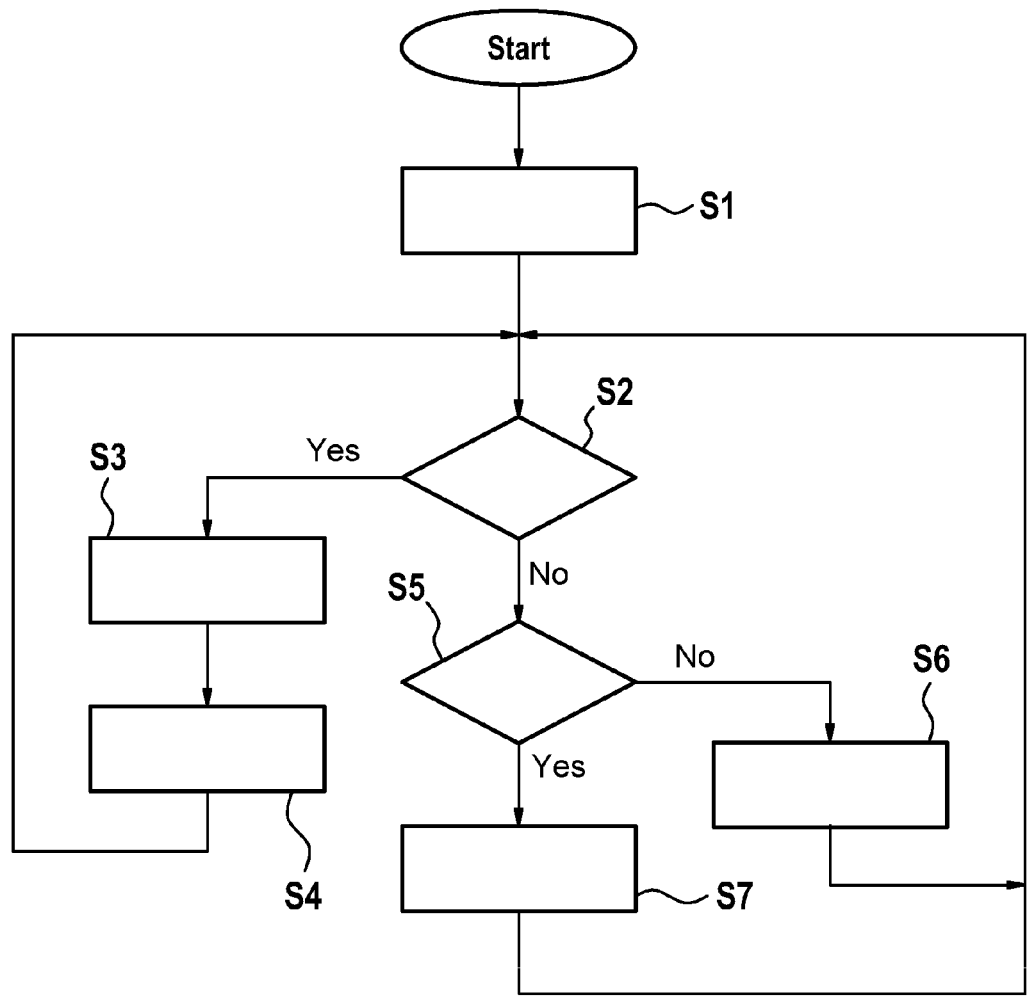
FIG. 2 shows a flowchart for illustrating the function for providing a continuous indication of movement.
Figure 3:
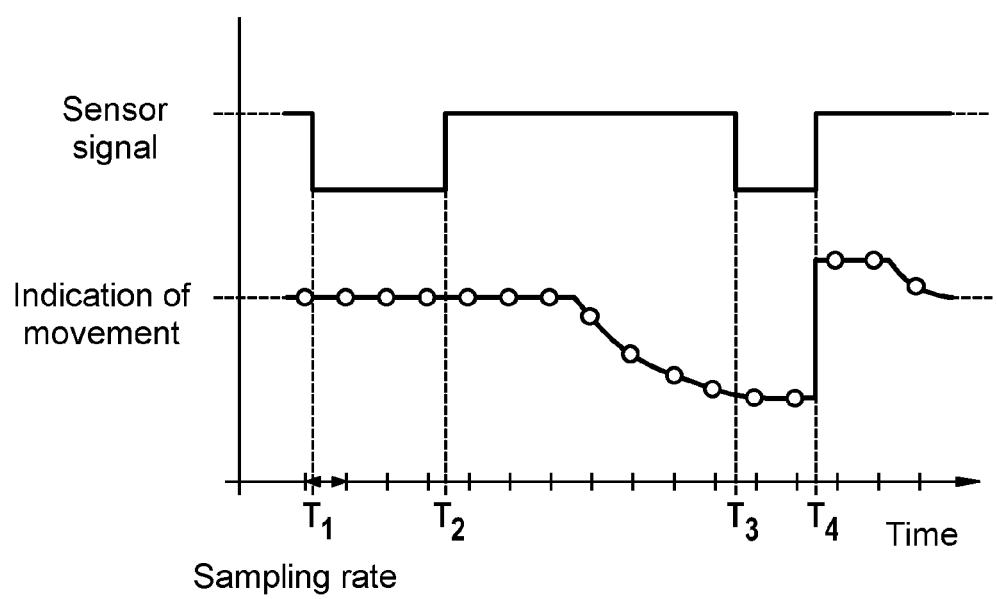
FIG. 3 shows a graph for illustrating the continuous indication of movement which is dependent on a signal from a position transmitter.

The frequency of the edges of the sensor signal which are provided by the position transmitter 9 is reduced, in particular, at speeds of the window pane 2 which are low on account of friction or other influences. This may result in the respective most current indication of movement generated from the sensor signals representing the speed or the rotational speed at a time which is too far in the past to ensure timely detection of trapping. In order to provide a continuous or quasi-continuous indication of movement or indication of rotational speed even at relatively low speeds of the window pane 2 or relatively low rotational speeds of the electric motor 4, a method for providing the continuous indication of movement is described below in connection with the flowchart in FIG. 2. The method is also illustrated using the timing diagram in FIG. 3. FIG. 3 shows the profile of the sensor signal and the profile of the indication of movement generated from the sensor signal.

The method begins after a second edge has been generated by the position transmitter 9 at a time T2 following the activation of the window regulator system 1 after a first edge at the time T1. An edge of the sensor signal corresponds to a change of a level of the sensor signal. An interval of time between the first edge and the second edge is determined using the two received edges.

After the interval of time dT=T2−T1 has been determined as the pulse duration between the last two received successive edges in step S1, an indication of a speed or a rotational speed, which depends on the pulse duration with respect to the last two successive edges, is provided as a permanent indication of movement. The indication of movement results from the fact that the angular range or the travel range, by which the shaft of the electric motor 4 or the window pane 2 has been moved after a next edge of the sensor signal is generated, is known. The ratio of the angular range to the pulse duration dT with regard to the last two received edges results in the indication of movement.

Beginning with the last received edge at the time T2, the sensor signal is now still checked in order to determine whether a further edge has been received (step S2). If this is the case (alternative: yes) at a time T3, the pulse duration is determined in step S3 as the interval of time dT between the last two received signal edges as dT=T3−T2, the indication of movement is adapted according to the freshly determined pulse duration dT in step S4 as described above and an indication of movement is provided. The process then jumps back to step S2.

If no edge of the sensor signal is detected (alternative: no) in step S2, step S5 checks whether the period elapsed since the last edge is greater than the last determined pulse duration as the interval of time between the last two received edges of the sensor signal. If this is not the case (alternative: no), the indication of movement which results from the most current pulse duration dT continues to be output in step S6 and the process jumps back to step S2. This indication of movement will correspond to the indication of movement last determined in step S1 or step S4.

If step S5 determines that the period since the last received edge of the sensor signal is greater than the most current pulse duration (alternative: yes), the indication of movement is corrected in step S7 according to the period elapsed since the last edge of the sensor signal. This is carried out, as described above, by determining the indication of movement as the ratio of the angular range or travel range, by which the shaft of the electric motor 4 or the window pane 2 has been moved, and the period elapsed since the last edge. The process then jumps back to step S2.

This is also illustrated in FIG. 3. It is seen that, after the pulse duration dT since the last edge of the sensor signal was received at the time T2 has elapsed, the indication of movement decreases from the time T2+dT=T2+(T2−T1) until the next edge of the sensor signal is received (time T3). Beginning with the time T3, the pulse duration dT as the interval of time between the last two received edges (T3, T2) of the sensor signal is permanently updated, as described above, and the indication of movement is first of all kept at the last determined indication of movement, as long as no further edge of the sensor signal is received during the period of the pulse duration starting from the time T3, or is accordingly permanently updated with the period elapsed since the last edge after the pulse duration has elapsed.

If an edge of the sensor signal is detected within the pulse duration dT since an edge of the sensor signal was last received, as is illustrated in the case of the edge at the time T4, the indication of movement is immediately updated, with the result that a sudden change in the indication of movement may also result.

The indication of movement provided may be provided either permanently for retrieval by a downstream function or may be provided cyclically at a frequency according to a sampling or providing rate which is greater than the frequency of the sensor signal provided by the position transmitter 9 at the maximum rotational speed or may be provided at intervals of time t which are shorter than the pulse durations of the edges of the sensor signal at the maximum rotational speed.

The invention claimed is:

1. A method for providing an indication of movement from a sensor signal of a position transmitter (9), the indication of movement indicating a speed, the sensor signal from the position transmitter (9) comprising a plurality of edges, the plurality of edges being alternating rising edges and falling edges, each rising or falling edge of the plurality of edges being generated by the sensor following a movement over a particular travel range, the method comprising:
   determining (S1) a pulse duration (dT) as an interval of time between a most recent two edges of the plurality of edges of the sensor signal;
   providing (S4, S6) the indication, when a time period corresponding to the pulse duration (dT) has elapsed since the most recent edge of the sensor signal;
   wherein the indication is provided faster than an interval of time that would elapse between edges of the sensor signal at a predefined maximum speed.

2. The method as claimed in claim 1, the indication which depends on the pulse duration (dT) being provided as the indication of movement if a time period corresponding to the pulse duration (dT) has not yet elapsed since the last edge.

3. The method as claimed in claim 1, the indication being determined as a ratio between the particular travel range and the pulse duration (dT).

4. The method as claimed in claim 1, further comprising providing the indication continuously.

5. The method as claimed in claim 1, wherein the indication depends on the pulse duration (dT).

6. The method as claimed in claim 1, wherein the indication depends on a period since the last edge of the sensor signal.

7. The method as claimed in claim 1, further comprising determining the indication as the ratio between the particular travel range and a time period elapsed since the last edge of the sensor signal.

8. The method as claimed claim 1, further comprising providing the indication at fixed time intervals.

9. A method for providing an indication of movement from a sensor signal from a position transmitter (9), the indication of movement indicating a speed, the sensor signal from the position transmitter (9) generating a plurality of edges, the plurality of edges being alternating rising edges and falling edges, each rising or falling of the plurality of edges generated following a movement over a particular travel range, the method comprising:
   determining (S1) a pulse duration (dT) as an interval of time between a most recent two edges of the plurality of edges of the sensor signal;
   providing (S4, S6) an indication based on of the pulse duration (dT) or an indication based on a time period since a last edge of the plurality of edges, when a time period corresponding to the pulse duration (dT) has elapsed since the most recent edge of the sensor signal;
   wherein the indication of movement is determined as a ratio between the particular travel range and the pulse duration (dT) or as the ratio between the particular travel range and a time period elapsed since the last edge of the plurality of edges, and wherein the interval of time is shorter than an interval of time between the plurality of edges at a predefined maximum speed of movement.

* * * * *